United States Patent
Sabelli et al.

(10) Patent No.: US 10,551,524 B2
(45) Date of Patent: Feb. 4, 2020

(54) BATCH AUTHENTICATION OF MATERIALS FOR AUTOMATED ANTI COUNTERFEITING

(71) Applicant: 3M INNOVATIVE PROPERTIES COMPANY, St. Paul, MN (US)

(72) Inventors: Anthony J. Sabelli, Darien, CT (US); Jennifer F. Shumacher, Woodbury, MN (US); Yanina Shkel, Princeton, NJ (US); Brian J. Stankiewicz, Mahtomedi, MN (US); Glenn E. Casner, Woodbury, MN (US); John A. Wheatley, Lake Elmo, MN (US); Andrew P. Bonifas, Alberta (CA); Ravishankar Sivalingam, Foster City, CA (US)

(73) Assignee: 3M INNOVATIVE PROPERTY COMPANIES, St. Paul, MN (US)

( * ) Notice: Subject to any disclaimer, the term of this patent is extended or adjusted under 35 U.S.C. 154(b) by 131 days.

(21) Appl. No.: 15/533,290

(22) PCT Filed: Dec. 7, 2015

(86) PCT No.: PCT/US2015/064279
§ 371 (c)(1),
(2) Date: Jun. 5, 2017

(87) PCT Pub. No.: WO2016/099981
PCT Pub. Date: Jun. 23, 2016

(65) Prior Publication Data
US 2017/0363772 A1  Dec. 21, 2017

Related U.S. Application Data

(60) Provisional application No. 62/093,467, filed on Dec. 18, 2014.

(51) Int. Cl.
*G06K 9/00* (2006.01)
*G01V 15/00* (2006.01)
(Continued)

(52) U.S. Cl.
CPC .............. *G01V 15/00* (2013.01); *G06T 7/001* (2013.01); *G06T 7/0006* (2013.01); *G06T 7/41* (2017.01)

(58) Field of Classification Search
None
See application file for complete search history.

(56) References Cited

U.S. PATENT DOCUMENTS 7,495,214 B2  2/2009  Pan
7,706,700 B2  4/2010  Pan
(Continued)

FOREIGN PATENT DOCUMENTS

CN  1259634  7/2000
JP  2004-316012 A  11/2004
(Continued)

OTHER PUBLICATIONS

International Search report for PCT International Application No. PCT/US2015/64279 dated Mar. 30, 2016, 4 pages.

*Primary Examiner* — Atiba O Fitzpatrick
(74) *Attorney, Agent, or Firm* — Yufeng Dong

(57) ABSTRACT

Systems and methods for authenticating material samples are provided. Characteristic features are measured for a batch of material samples that comprise substantially the same composition and are produced by substantially the same process. The measured characteristic features have respective variability that is analyzed to extract statistical parameters. In some cases, reference ranges are determined based on the extracted statistical parameters for the batch of material samples. The corresponding statistical parameters
(Continued)

of a test material sample are compared to the reference ranges to verify whether the test material sample is authentic.

11 Claims, 6 Drawing Sheets

(51) Int. Cl.
*G06T 7/41* (2017.01)
*G06T 7/00* (2017.01)

(56) References Cited

U.S. PATENT DOCUMENTS

| | | | |
|---|---|---|---|
| 7,715,733 B2 | 5/2010 | Pan | |
| 7,853,792 B2 | 12/2010 | Cowburn | |
| 7,995,196 B1 | 8/2011 | Fraser | |
| 8,078,875 B2 | 12/2011 | Cowburn | |
| 8,180,174 B2 | 5/2012 | Di Venuto | |
| 8,497,983 B2 | 7/2013 | Cowburn | |
| 2003/0118191 A1 | 6/2003 | Wang | |
| 2004/0146615 A1* | 7/2004 | McDonald | G01N 21/359 426/231 |
| 2004/0197535 A1 | 10/2004 | Bleckmann | |
| 2007/0122007 A1 | 5/2007 | Austin et al. | |
| 2007/0280073 A1 | 12/2007 | Selinfreund | |
| 2009/0074259 A1 | 3/2009 | Baltatu | |
| 2012/0243797 A1* | 9/2012 | Di Venuto Dayer | G06K 9/00577 382/218 |
| 2013/0228619 A1 | 9/2013 | Soborski | |
| 2014/0341436 A1* | 11/2014 | Tin | G06K 9/4619 382/108 |

FOREIGN PATENT DOCUMENTS

| | | |
|---|---|---|
| JP | 2005-176389 A | 6/2005 |
| WO | WO 2002-12872 | 2/2002 |
| WO | WO 2011-077459 | 6/2011 |

\* cited by examiner

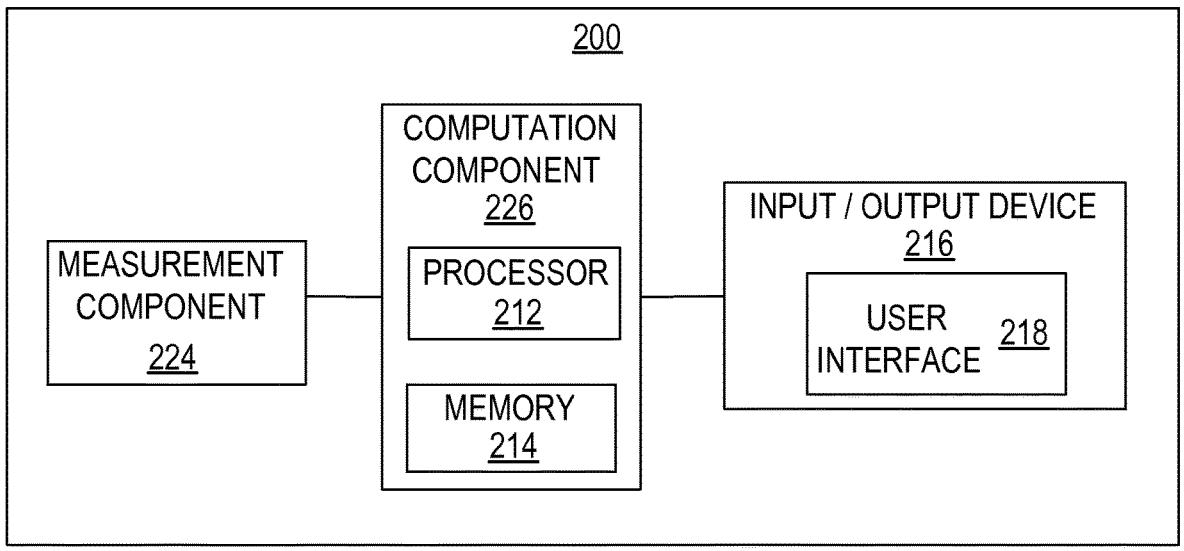
*FIG. 2*
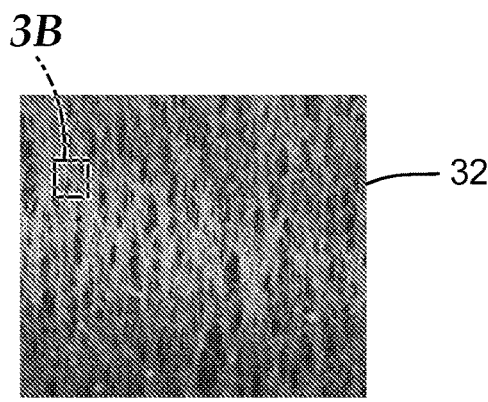
*FIG. 3A*
| 0.5 | 0.4 | 1 | ... |
|---|---|---|---|
| 0.4 | 0.4 | 0.8 | ... |
| 0.2 | 0 | 0.7 | ... |
| ... | ... | ... | ... |
*FIG. 3B*

BATCH AUTHENTICATION OF MATERIALS FOR AUTOMATED ANTI COUNTERFEITING

CROSS REFERENCE TO RELATED APPLICATIONS

This application is a national stage filing under 35 U.S.C. 371 of PCT/US2015/064279, filed Dec. 7, 2015, which claims the benefit of U.S. Application No. 62/093,467, filed Dec. 18, 2014, the disclosure of which is incorporated by reference in its/their entirety herein.

TECHNICAL FIELD

The present disclosure relates to authenticating material samples based on statistics of material properties, for example, material properties of a batch of material samples.

BACKGROUND

Counterfeiting is a global problem. Various systems and methods for authenticating goods, products, or materials are described. U.S. Patent Application Publication No. 2004/197535, U.S. Pat. Nos. 7,495,214, 7,706,700, and 7,715,733 describe various techniques to address counterfeiting and authenticate goods, products, or materials.

SUMMARY

In a multitude of industries and applications, there is a desire to authenticate materials, goods, or products in an efficient, and cost-effective way. Industries and applications include, but are not limited to, security documentation such as passports and identification cards, medical tape or drapes, respirator masks, filters, optical films, insulation materials, abrasive discs or sand paper, etc. Many material samples have inherent physical variability in their properties. While a batch of material samples may exhibit different material properties or features, the statistics and/or parameters of the material properties or features may vary to a less extent from sample to sample. Briefly, in one aspect, the present disclosure describes systems and methods for authenticating material samples by using statistics and/or parameters of physical variations present in material samples.

The term "a batch of material samples" described herein refers to multiple material samples that include substantially the same composition, and/or are produced by substantially the same process.

In one aspect, a method of authenticating material samples includes measuring one or more characteristic features for a plurality of material samples where the plurality of material samples are a batch of material samples that include substantially the same composition and are produced by substantially the same process. The one or more characteristic features for the batch of material samples have respective variability. The method further includes analyzing the respective variability to extract one or more statistical parameters for each of the material samples.

In another aspect, a method of automated anti-counterfeiting includes incorporating a patch of material into a visible surface of a test object at a predetermined position. The patch of material originates from a batch of materials of substantially the same composition and produced in the same process. The characteristic features for the batch of materials have respective variability that varies from each other. The method further includes obtaining one or more digital images for each of the batch of materials, extracting the variability from the obtained digital images, generating a plurality of basis functions based on the extracted variability, obtaining a digital image for the patch of material incorporated into a test object at the predetermined position, and reconstructing the digital image for the patch of material using a subset of the plurality of basis functions.

In another aspect, a system for authenticating material samples includes a measurement component configured to measure one or more characteristic features for a plurality of material samples. The plurality of material samples are a batch of material samples that comprise substantially the same composition and are produced by substantially the same process. The one or more characteristic features for the batch of material samples have respective variability. The system further includes a computation component configured to analyze the respective variability to extract one or more statistical parameters for each of the material samples.

Various unexpected results and advantages are obtained in exemplary embodiments of the disclosure. One such advantage of exemplary embodiments of the present disclosure is that the use of statistics and/or parameters of physical variations can provide a distinct, cost-effective way to authenticate materials or goods/products incorporating the materials in real time. The embodiments described herein do not need to validate a unique signature of the materials to be tested. Instead, systems and methods are provided herein for authenticating material samples by evaluating material properties/features inherent in the materials.

Listing of Exemplary Embodiments

Exemplary embodiments are listed below. It is to be understood that any of embodiments A to K, L to P, and Q can be combined.

Embodiment A. A method of authenticating material samples, comprising:

measuring one or more characteristic features for a plurality of material samples, the plurality of material samples being a batch of material samples that comprise substantially the same composition and are produced by substantially the same process, the one or more characteristic features for the batch of material samples having respective variability; and analyzing the respective variability to extract one or more statistical parameters for each of the material samples.

Embodiment B. The method of embodiment A, further comprising determining a reference range based on the extracted statistical parameters for the batch of material samples.

Embodiment C. The method of embodiment B, further comprising measuring the one or more characteristic features of a test material sample to be authenticated to obtain one or more statistical parameters thereof, and comparing the obtained one or more statistical parameters to the determined reference range.

Embodiment D. The method of embodiment C, wherein if the obtained one or more statistical parameters is within the reference range, the sample is authenticated.

Embodiment E. The method of any preceding embodiments, wherein measuring the one or more material properties includes obtaining one or more digital images for each of the batch of material samples, and extracting the respective variability from the obtained digital images.

Embodiment F. The method of embodiment E, further comprising generating a plurality of basis functions based on the extracted variability.

Embodiment G. The method of embodiment E or F, further comprising obtaining one or more digital images for a test material sample to be authenticated, and reconstructing the digital images using a subset of the plurality of basis functions.

Embodiment H. The method of embodiment F, wherein the plurality of basis functions are generated using a principal component analysis (PCA).

Embodiment I. The method of any preceding embodiments, wherein the one or more characteristic features includes an optical feature, an acoustical feature, an elastic feature, a structural feature, an electronic feature, a magnetic feature, an electrets related feature, or a mechanical feature.

Embodiment J. The method of any preceding embodiments, wherein the batch of material samples is selected from a batch of abrasives, optical films, and nonwovens.

Embodiment K. A method of automated anti-counterfeiting, comprising:
 incorporating a patch of material into a visible surface of a test object at a predetermined position, the patch of material originating from a batch of materials of substantially the same composition and produced in the same process, the characteristic feature for the batch of materials having respective variability that varies from each other;
 obtaining one or more digital images for each of the batch of materials;
 extracting the variability from the obtained digital images;
 generating a plurality of basis functions based on the extracted variability;
 obtaining a digital image for the patch of material incorporated into a test object at the predetermined position; and
 reconstructing the digital image for the patch of material using a subset of the plurality of basis functions.

Embodiment L. The method of embodiment K, further comprising evaluating a reconstruction error for the reconstruction, and identifying the test object as authentic when the reconstruction error is lower than a predetermined value.

Embodiment M. The method of embodiment K or L, wherein the batch of materials includes a batch of multilayer optical films, or a batch of nonwovens.

Embodiment N. The method of embodiment N, wherein the batch of multilayer optical films is selected a batch of flame embossed films, mirror films, or wavelength specific filter films.

Embodiment O. A system for authenticating material samples, comprising:
 a measurement component configured to measure one or more characteristic features for a plurality of material samples, the plurality of material samples being a batch of material samples that comprise substantially the same composition and are produced by substantially the same process, the one or more characteristic features for the batch of material samples having respective variability; and
 a computation component configured to analyze the respective variability to extract one or more statistical parameters for each of the material samples.

Embodiment P. The system of embodiment O, wherein the computation component is configured to determine a reference range based on the extracted statistical parameters for the batch of material samples.

Embodiment Q. The system of embodiment P, wherein the measurement component is configured to measure the one or more characteristic features of a test material sample to be authenticated to obtain one or more statistical parameters thereof, and the computation component is configured to compare the obtained one or more statistical parameters to the determined reference range.

Embodiment R. The system of any one of embodiments O to Q, wherein the measurement component includes a camera.

Embodiment S. The system of any one of embodiments O to R, wherein the one or more characteristic features includes an optical feature, an acoustical feature, an elastic feature, a structural feature, an electronic feature, a magnetic feature, an electrets related feature, or a mechanical feature.

Embodiment T. The system of any one of embodiments O to S, wherein the batch of material samples is selected from a batch of abrasives, optical films, and nonwovens.

Various aspects and advantages of exemplary embodiments of the disclosure have been summarized. The above Summary is not intended to describe each illustrated embodiment or every implementation of the present certain exemplary embodiments of the present disclosure. The Drawings and the Detailed Description that follow more particularly exemplify certain preferred embodiments using the principles disclosed herein.

BRIEF DESCRIPTION OF THE DRAWINGS

The disclosure may be more completely understood in consideration of the following detailed description of various embodiments of the disclosure in connection with the accompanying figures, in which:

FIG. 2 illustrates a block diagram for a system of authenticating material samples, according to one embodiment.

FIG. 3A illustrates an optical image of a material sample, according to one embodiment.

FIG. 3B illustrates intensity values of image pixels of the optical image of FIG. 3A.

Figure 1:
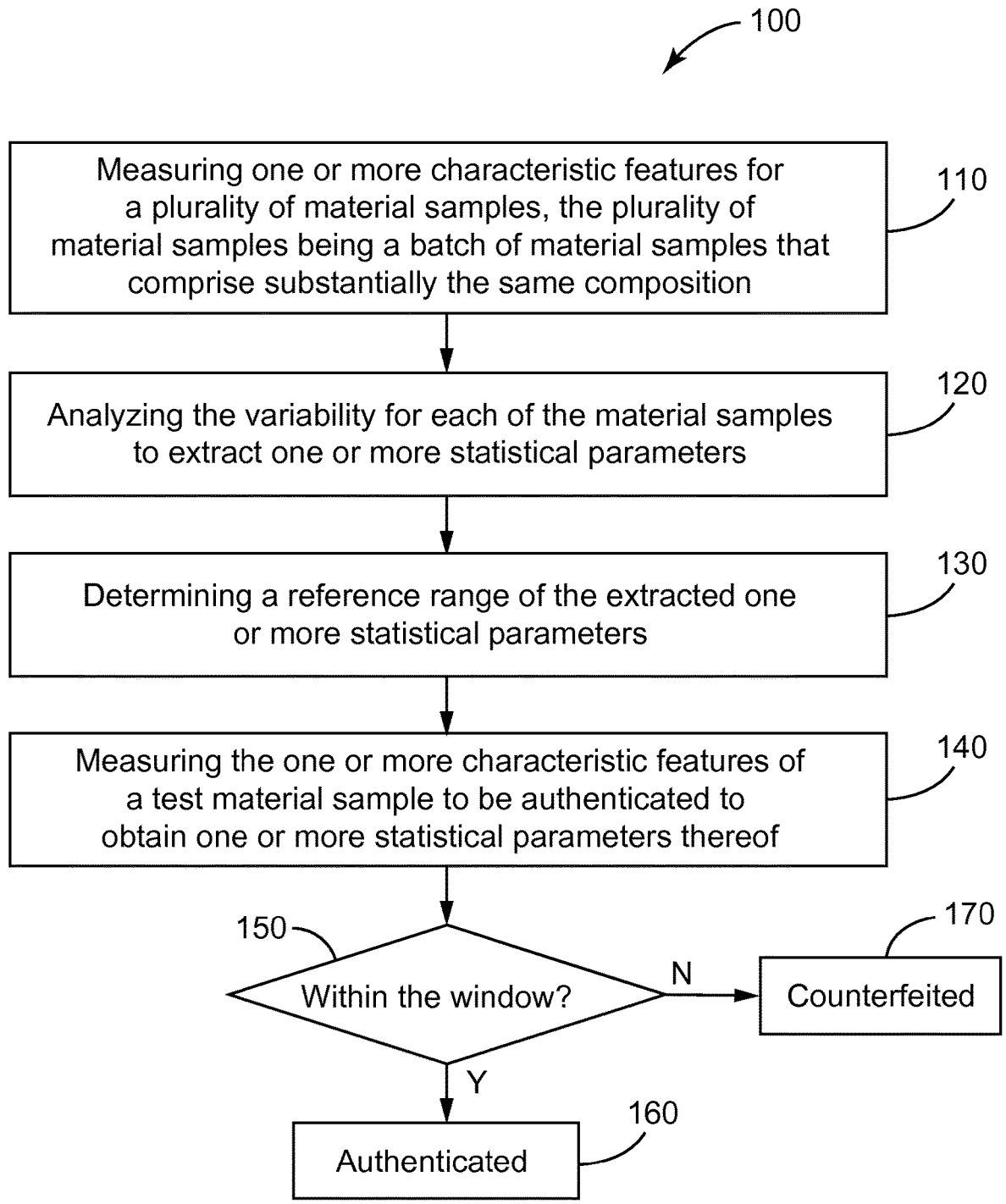
FIG. 1 is a flow diagram of a method for authenticating material samples, according to one embodiment.

In the drawings, like reference numerals indicate like elements. While the above-identified drawing, which may not be drawn to scale, sets forth various embodiments of the present disclosure, other embodiments are also contemplated, as noted in the Detailed Description. In all cases, this disclosure describes the presently disclosed disclosure by way of representation of exemplary embodiments and not by express limitations. It should be understood that numerous other modifications and embodiments can be devised by those skilled in the art, which fall within the scope and spirit of this disclosure.

DETAILED DESCRIPTION

Many material samples have inherent physical variability in their properties. While a batch of material samples may exhibit different material properties or features, the statistics and/or parameters of the material properties or features may vary to a less extent from sample to sample. Briefly, in one aspect, the present disclosure describes systems and methods for authenticating material samples by using statistics and/or parameters of physical variations present in material samples.

In some embodiments, systems and methods are provided to authenticate a material sample as being a member of a batch of material samples. That is, the material sample can be validated to be authentic or counterfeit. The authentication of material samples can be based on fundamental statistics of inherent randomness such as, for example, in the structure, substructure or texture of a material sample. In one embodiment, a material sample can be imaged and the statistics related to random structure (or substructure or texture) present in the image of the material sample can be calculated and compared to reference values generated by evaluating material properties of a batch of such material samples beforehand.

FIG. 1 illustrates a method 100 of authenticating material samples, according to one embodiment. At 110, one or more characteristic features are measured for a plurality of material samples. Each of the material samples belongs to a batch of material samples that contain substantially the same composition and/or are produced by substantially the same processes. The characteristic features described herein have respective variability or inherent randomness. For example, an optical image of a material sample may include pixels having various intensities which may be related to a structure, a substructure, or a texture of the material sample and reflect the inherent randomness or physical variability thereof. The characteristic features may include, for example, an optical feature (e.g., intensity), an acoustical feature (e.g., frequency absorption), an elastic feature (e.g., modulus), a structural feature (e.g., shape), an electronic feature (e.g., resistance), a magnetic feature (e.g., field strength), an electrets related feature (e.g., dielectric), a mechanical feature (e.g., yield strength), etc. In some embodiments, the batch of material samples can be selected from, for example, a batch of abrasives, optical films, and nonwovens, which are commercially available from 3M Company, Saint Paul, Minn. The method 100 then proceeds to 120.

At 120, the variability or randomness present in the characteristic features of material samples is analyzed to extract one or more statistical parameters for each of the material samples. In some embodiments, the variability present in optical images of the material samples can be analyzed as pixels having various intensities and one or more statistical parameters can be extracted from the various intensities. The method 100 then proceeds to 130.

At 130, on or more reference ranges are determined based on the extracted one or more statistical parameters. In some embodiments, the extracted statistical parameters of the batch of material samples can form a distribution such as, for example, a normal or Gaussian distribution having a mean and a variance. The one or more reference ranges can be determined based on the distribution. The method 100 then proceeds to 140.

At 140, one or more characteristic features of a test material sample are measured to obtain one or more statistical parameters thereof. In some embodiments, the statistical parameter for the test material sample can be obtained in the same manner as for the batch of material samples. The method 100 then proceeds to 150.

At 150, the obtained one or more characteristic features of the test material sample are compared to one of the reference ranges. If the obtained one or more characteristic features of the test material sample are within the reference range, the test material sample is verified to be an authentic material sample at 160. If the obtained one or more characteristic features of the test material sample are not within the reference range, he test material sample is verified to be a counterfeit at 170.

In some embodiments, a digital image can be captured for each of the batch of material samples, and the variability from the obtained digital images can be extracted, which can be illustrated by, for example, in FIGS. 3A-B and 4A-D to be described further below.

In some embodiments, a plurality of basis functions can be generated based on the extracted variability. A digital image for the test material sample can be captured, and the digital image can be reconstructed by using a subset of the plurality of basis functions. In some embodiments, the plurality of basis functions are generated using a principal component analysis (PCA).

In some embodiments, a patch of material (e.g., film material) can be incorporated into a visible surface of an object at a predetermined position. The patch of material may originate from one material of a batch of materials. The batch of materials may contain substantially the same composition and may be produced in the same process where the characteristic feature for the batch of materials have respective inherent randomness that varies from each other. A digital image can be obtained for each of the batch of materials and variability or inherent randomness can be extracted from the obtained digital images. In some embodiments, a plurality of basis functions can be generated based on the extracted inherent randomness. A digital image can be obtained for a test object at the predetermined position. In some embodiments, a reconstruction error can be evaluated for reconstructing the digital image for the test object using a subset of the plurality of basis functions. The test object can be identified as authentic when the reconstruction error is lower than a predetermined value or threshold.

In some embodiments, the batch of materials includes a batch of multilayer optical films, or a batch of nonwovens. In some embodiments, the batch of multilayer optical films is selected from a batch of flame embossed films, mirror films, or wavelength specific filter films.

FIG. 2 illustrates a system 200 for authenticating material samples by implementing, for example, the method 100, according to one embodiment. The system 200 includes a measurement component 224, a computation component 226, and one or more input/output devices 216.

The measurement component 224 is configured to measure one or more characteristic features/properties of the material samples. The measurement component 224 can be various measurement tools to measure material properties having inherent variability including, for example, one or more of an optical feature, an acoustical feature, an elastic feature, a structural feature, an electronic feature, a magnetic feature, electrets, or a mechanical feature. In some embodiments, the measurement component 224 can include, for example, a camera for capturing one or more images of the material samples.

In the embodiment of FIG. 2, the computation component 226 includes a processor 212 and a memory 214. The computation component 226 is functionally connected to the measurement component 224, receives signals related to the measured characteristic features from the measurement component 224, and extract one or more statistical parameters for each of the material samples by analyzing the received signals. The processor 212 then determine a reference range based on the extracted statistical parameters for the batch of material samples. In some embodiments, the processor 212 can determine a distribution of the extracted statistical parameters and obtain one or more reference ranges based on the distribution.

The determined reference range can be stored in the memory 214. In some embodiments, when a test material sample is to be authenticated, one or more corresponding characteristic features of the test material sample can be measured by the measurement component 224. The computation component 226 can extract one or more statistical parameters based on the measured characteristic features of the test material sample, and compare the extracted statistical parameters to the reference range. If the obtained one or more characteristic features of the test material sample are within the reference range, the computation component 226 can verify that the test material sample is an authentic material sample or originals from the batch of material samples. If the obtained one or more characteristic features of the test material sample are not within the reference range, the computation component 226 can determine that the test material sample is not authentic or does not originate from the batch of material samples.

In some embodiments, the reference range may be dynamically updated, refined, or processed as the comparison of the extracted statistical parameters is processed by the computation component 226.

In some embodiments, the measurement component 224 may be a portable device that can work in field. The measurement component 224 can wirelessly communicate with a remote computing device such as, for example, the computation component 226 by sending and receiving signals. The computation component 226 may be integrated with, for example, a computer, a server, a mobile phone, etc. The computation component 226 can process the received material property signals and send the authentication information to the input/output device 216 to display thereon.

The memory 214 stores information. In some embodiments, the memory 214 can store instructions for performing the methods or processes described herein. In some embodiments, material properties data can be pre-stored in the memory 214. One or more properties from the material samples, for example, an optical feature, an acoustical feature, an elastic feature, a structural feature, an electronic feature, a magnetic feature, an electrets related feature, or a mechanical feature, may be stored as the material properties data. The determined reference ranges for the batch of material samples can also be stored in the memory 214.

The memory 214 may include any volatile or non-volatile storage elements. Examples may include random access memory (RAM) such as synchronous dynamic random access memory (SDRAM), read-only memory (ROM), non-volatile random access memory (NVRAM), electrically erasable programmable read-only memory (EEPROM), and FLASH memory. Examples may also include hard-disk, magnetic tape, a magnetic or optical data storage media, a compact disk (CD), a digital versatile disk (DVD), a Blu-ray disk, and a holographic data storage media.

The processor 212 may include, for example, one or more general-purpose microprocessors, specially designed processors, application specific integrated circuits (ASIC), field programmable gate arrays (FPGA), a collection of discrete logic, and/or any type of processing device capable of executing the techniques described herein. In some embodiments, the processor 212 (or any other processors described herein) may be described as a computing device. In some embodiments, the memory 214 may be configured to store program instructions (e.g., software instructions) that are executed by the processor 212 to carry out the processes or methods described herein. In other embodiments, the processes or methods described herein may be executed by specifically programmed circuitry of the processor 212. In some embodiments, the processor 212 may thus be configured to execute the techniques for authenticating material samples described herein. The processor 212 (or any other processors described herein) may include one or more processors.

Input/output device 216 may include one or more devices configured to input or output information from or to a user or other device. In some embodiments, the input/output device 216 may present a user interface 218 where a user may control the authentication of material samples. For example, the user interface 218 may include a display screen for presenting visual information to a user. In some embodiments, the display screen includes a touch sensitive display. In some embodiments, a user interface 218 may include one or more different types of devices for presenting information to a user. The user interface 218 may include, for example, any number of visual (e.g., display devices, lights, etc.), audible (e.g., one or more speakers), and/or tactile (e.g., keyboards, touch screens, or mice) feedback devices. In some embodiments, the input/output devices 216 may represent one or more of a display screen (e.g., a liquid crystal display or light emitting diode display) and/or a printer (e.g., a printing device or component for outputting instructions to a printing device). In some embodiments, the input/output device 216 may be configured to accept or receive program instructions (e.g., software instructions) that are executed by the processor 212 to carry out the embodiments described herein.

The system 200 may also include other components and the functions of any of the illustrated components including the processor 212, the memory 214, and the input/output devices 216 may be distributed across multiple components and separate devices such as, for example, computers. The system 200 may be configured as a workstation, desktop computing device, notebook computer, tablet computer, mobile computing device, or any other suitable computing device or collection of computing devices. The system 200 may operate on a local network or be hosted in a Cloud computing environment. The illustrated components of FIG. 2 are shown merely to explain various aspects of the present disclosure and the addition or removal of components would be apparent to one of skill in the art.

FIGS. 3A-B and 4A-D illustrate presenting and analyzing variability or inherent randomness present in optical images of material samples, according to some embodiments. FIG. 3A shows an optical image 32 captured for a material sample. The optical image 32 includes pixels having various intensities such as shown in Table 34 of FIG. 3B which may relate to, for example, a structure, a substructure, or a texture on the surface of the material sample. The optical image 32 can be captured by, for example, the measurement component 224 of FIG. 2. The various intensities of the pixels reflect, for example, the inherent randomness of the substructure or texture of the material sample surface. The intensity values of image pixels in an exemplary portion 322 of the optical image 32 are shown in Table 34. The intensity values can be normalized, via for example the computation component 226 of FIG. 2, to be between 0 and 1 and are listed in an array m×n. It is to be understood that any portion of the optical image 32 or the whole optical image 32 can be used to obtain the corresponding intensity values.

One or more statistical parameters can be extracted from the array of various intensities such as shown in Table 34. The statistical parameters can include, for example, a mean, a variance, a skewness, a location parameter, a dispersion parameter, a scale parameter, a shape parameter, etc.

In some embodiments, the array of various material properties (e.g., the intensities in Table 34) can be taken as a "moment" in mathematics. The "moment" is a specific quantitative measure of the shape of a set of values or points. For example, if the points represent mass, the zeroth moment is the total mass, the first moment divided by the total mass is the center of mass, and the second moment is the rotational inertia. If the points represent probability density, the zeroth moment is the total probability (i.e. one), the first moment is the mean, the second moment is the variance, and the third moment is the skewness.

Figure 4A:
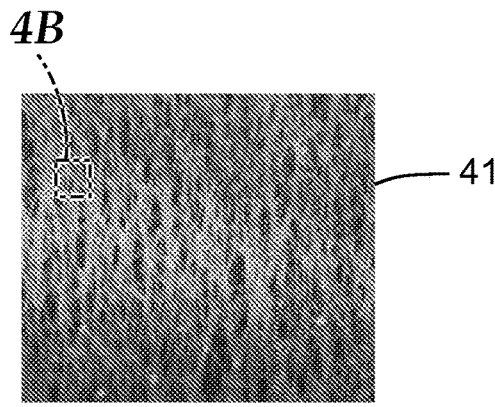
FIG. 4A illustrates an optical image for a first material sample of a batch of material samples, according to one embodiment.
Figure 4B:
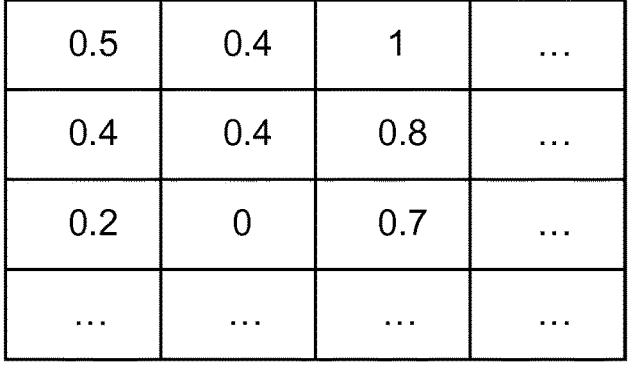
FIG. 4B illustrates intensity values of image pixels of the optical image of FIG. 4A.
Figure 4C:
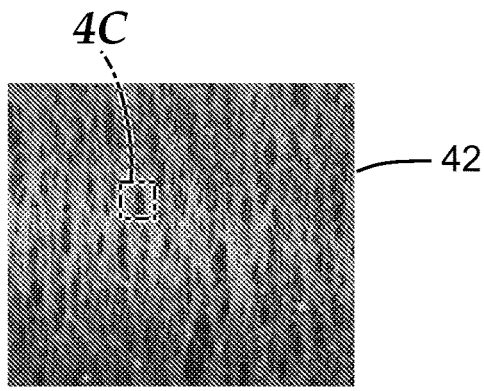
FIG. 4C illustrates an optical image for a second material sample of the batch of material samples.
Figure 4D:
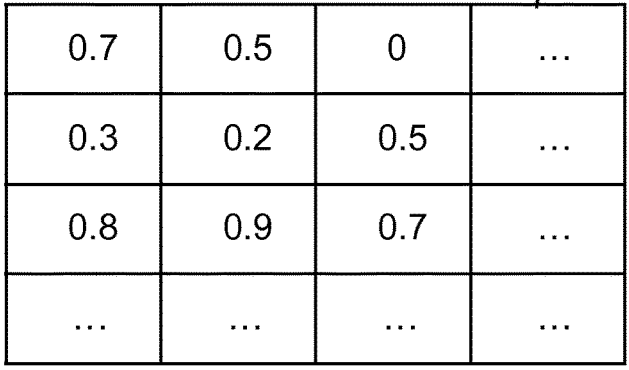
FIG. 4D illustrates intensity values of image pixels of the optical image of FIG. 4C.

FIGS. 4A and 4C show optical images 41 and 42 captured for a first material sample and a second material sample, respectively. The first and second material samples are from the same batch of material samples. The optical images 41 and 42 each include pixels having various intensities which may relate to a structure, a substructure, or a texture on the surface of the respective material samples. The various intensities of the pixels reflect the inherent randomness of the substructure or texture of the respective material sample surface. The intensity values of image pixels in the respective portions of the optical images 41 and 42 are shown in Tables 44 and 45 of FIGS. 4B and 4D, respectively. The intensity values are normalized to be between 0 and 1 and are listed in arrays. The intensity values in Tables 44 and 45 vary with each other. Such variation reflects the randomness inherent in the properties of the material samples, and the randomness inherent in the processes for producing the batch of material samples.

One or more statistical parameters can be extracted from the various intensities for each of the material samples such as shown in Tables 44 and 45. The statistical parameters can include, for example, a mean, a variance from the mean, a location parameter, a dispersion parameter, a scale parameter, a shape parameter, etc.

For a batch of material samples $S_1, S_2 \ldots S_N$, a series of statistical parameters $P_1, P_2 \ldots P_N$ can be extracted for the respective material samples $S_1, S_2 \ldots S_N$. The statistical parameters $P_1, P_2 \ldots P_N$ can form a distribution that has, for example, a mean, a variance, etc. The batch can include the number N of materials samples that are enough to determine the distribution. For example, the number N can be an integer no less than two, no less than five, no less than ten, no less than twenty, or no less than one hundred. In some embodiments, the more material samples in the batch, the more precise the distribution can be. A desired reference range can be determined based on the distribution of the statistical parameters $P_1, P_2 \ldots P_N$. When a test material sample is to be authenticated, the corresponding statistical parameter can be extracted from the measured characteristic features, and compared with the determined reference range to verify whether the test material sample is authentic or originates from the batch of material samples.

Figure 5A:
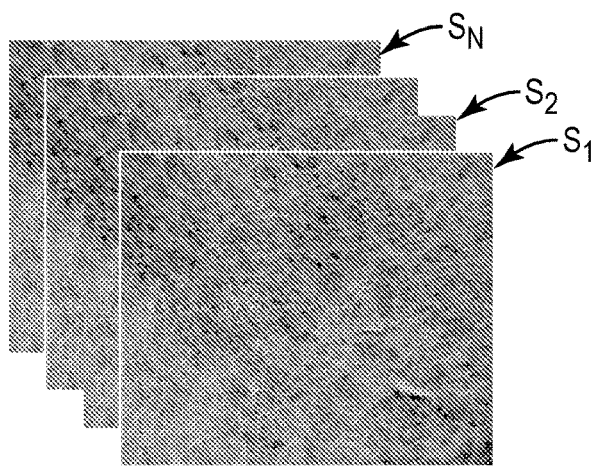
FIG. 5A illustrates images for a batch of nonwoven samples, according to one embodiment.
Figure 5B:
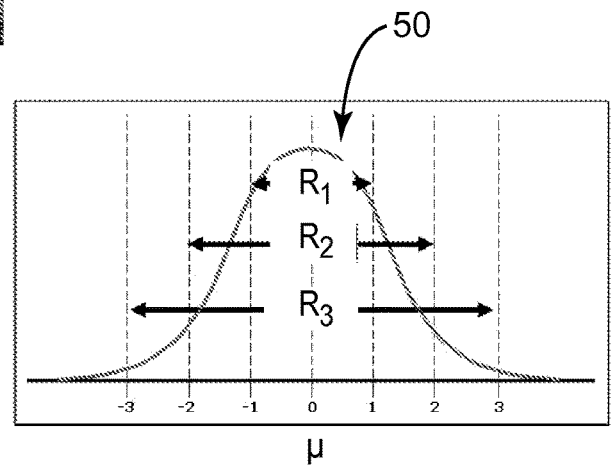
FIG. 5B illustrates a distribution of light transmission for the batch of nonwoven samples of FIG. 5A.

FIG. 5A illustrates images for an exemplary batch of nonwoven samples $S_1, S_2 \ldots S_N$ which have substantially the same composition and are manufactured by substantially the same process. The light transmission of the nonwoven samples was measured by, for example, the measurement component 224 of FIG. 2 to be $T_1, T_2 \ldots T_N$, respectively. A distribution 50 of light transmission for the batch of nonwoven samples, as shown in FIG. 5B, was obtained by the computation component 226 of FIG. 2 based on the measured light transmission ($T_1, T_2 \ldots T_N$). The distribution 50 has a mean and a variance.

Various reference ranges such as, for example, $R_1, R_2$ and $R_3$ shown in FIG. 5B, can be determined from the distribution 50 depending on respectively preset criteria for authentication. In the embodiment shown in FIG. 5B, the distribution 50 is substantially a normal or Gaussian distribution. It is to be understood that the distribution 50 can be other types of distributions such as, for example, exponential family distributions or student's t-distribution.

Figure 6A:
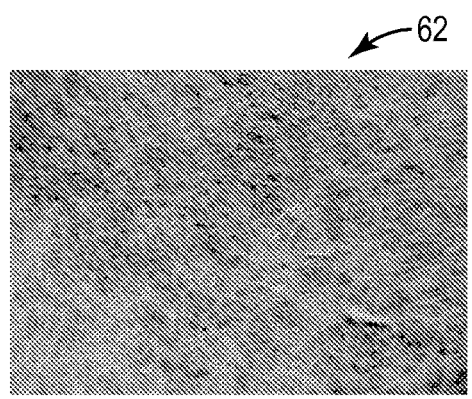
FIG. 6A illustrates an image of test nonwoven sample.

FIG. 6A illustrates an image for a nonwoven test sample 62 to be authenticated. In some embodiments, an average light transmission $T_{ave}$ of the test sample 62 can be measured and compared to a desired reference range (e.g., $R_1, R_2$ or $R_3$) of the distribution 50 to determine whether the test sample 62 is authentic, that is, whether the test sample 62 originates from the batch of material samples or has the same composition and was produced by the same process as the batch of nonwoven samples $S_1, S_2 \ldots S_N$ of FIG. 5A. If the average light transmission $T_{ave}$ of the test sample 62 falls into the desired reference range, the test sample 62 is verified to be authentic; otherwise, the test sample 62 is determined to be a counterfeit.

Figure 6B:
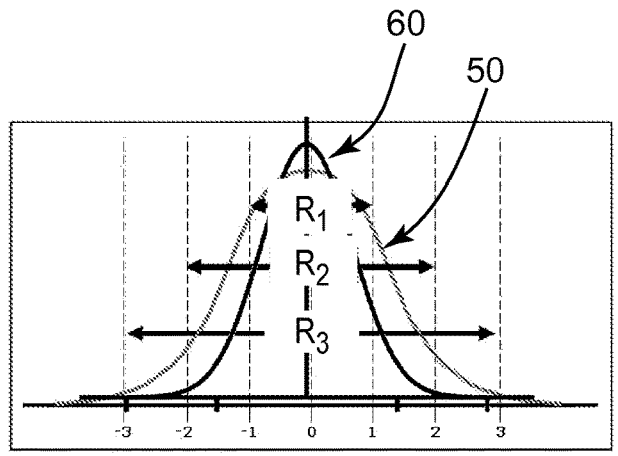
FIG. 6B illustrates authenticating the test nonwoven sample of FIG. 6A by comparing to the batch of nonwoven samples of FIG. 5A.

In other embodiments, a series of light transmission measurements can be conducted for the test sample 62. For example, various local areas of the test sample 62 can be randomly selected to measure the light transmission thereof. The series of light transmission measurements from the test sample 62 can result in a series of light transmission values which form a distribution 60 of light transmission as shown in FIG. 6B for the test sample 62. In the embodiment of FIG. 6B, the distribution 60 is substantially a standard or Gaussian distribution. The distribution 60 can be compared with the distribution 50 in terms of mean and variance to determine whether the test sample 62 is authentic or originates from the batch of nonwoven samples $S_1, S_2 \ldots S_N$. In some embodiments, the distributions can be compared by using an appropriate statistical hypothesis test such as, for example, a Kolmogorov-Smirnov test which is known in the art.

In some embodiments, one or more images of a test material sample to be authenticated can be captured by the measurement component 224 such as, for example, a standard optical camera. The captured one or more images can be reconstructed with an image "dictionary" or basis functions. The image "dictionary" or basis functions can be pre-obtained from a batch of authentic material samples. The image "dictionary" or basis functions can be generated by, for example, a principal component analysis (PCA) and can be stored in the memory 214 as materials data. In some embodiments, the one or more images of the test material sample can be reconstructed from a selected subset of the basis functions. The reconstructed images can be evaluated by the computation component 226 to determine a reconstruction error. The reconstruction error can be used to evaluate how similar the test material sample is to the batch of authentic material samples. For example, if the reconstruction error is higher than a predetermined error, the test material sample is considered to be not authentic.

In some embodiments, a process for obtaining a basis function via PCA can include, for example, separating an image into multiple image patches (e.g., 20×20 pixel patches), vectorizing image patches (e.g., turn patches into 400×1 vectors), arranging the vectors into a data matrix (e.g., concatenating vectors into 400×number of patches matrix), using Singular Value Decomposition to determine the principal components of the data matrix, and turning principal component vectors back into image patches.

In some embodiments, a process for reconstructing an image can include, for example, determining a subset of principal components to use in reconstruction (typically the first N principal components for a specific threshold, partitioning a new image into corresponding image patches, linearly projecting the image patches onto the orthonormal basis that is the principal components, and summing the projected patches to form a reconstruction of the candidate image patch.

In some embodiments, basis functions used herein can also be obtained from other methods such as, for example, sparse dictionary learning, with reconstruction accomplished with a learned dictionary via one of many projection methods (e.g., matching pursuit).

Figure 7A:
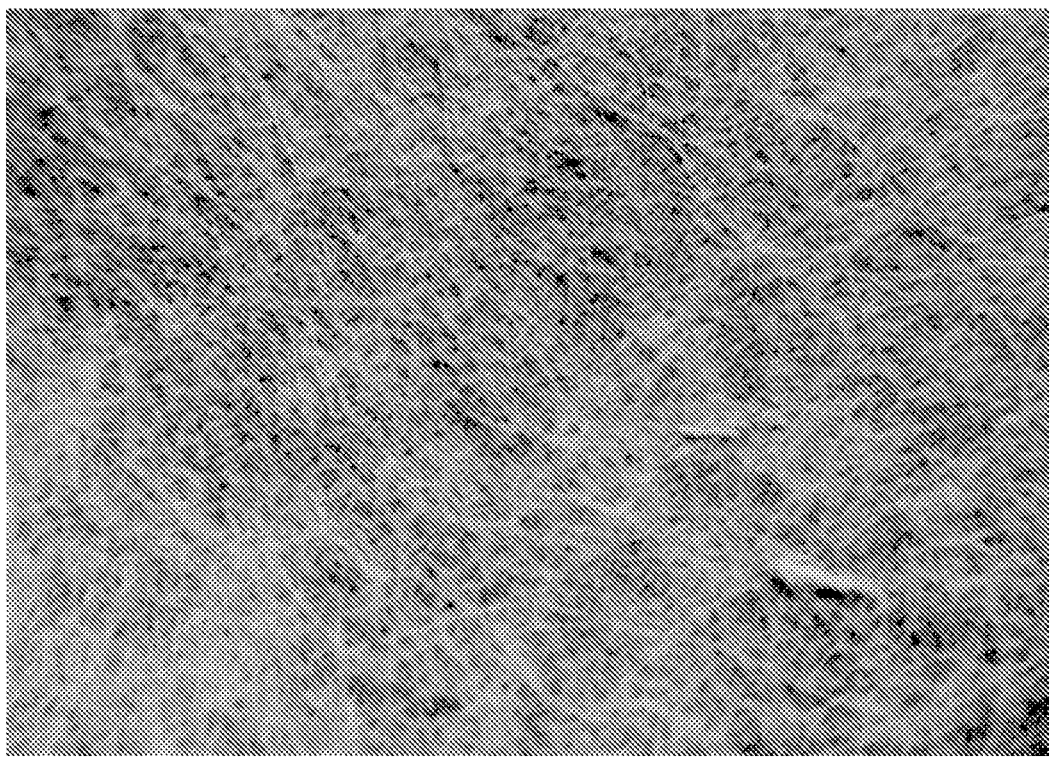
FIG. 7A illustrates an optical image of a nonwoven material sample.
Figure 7B:
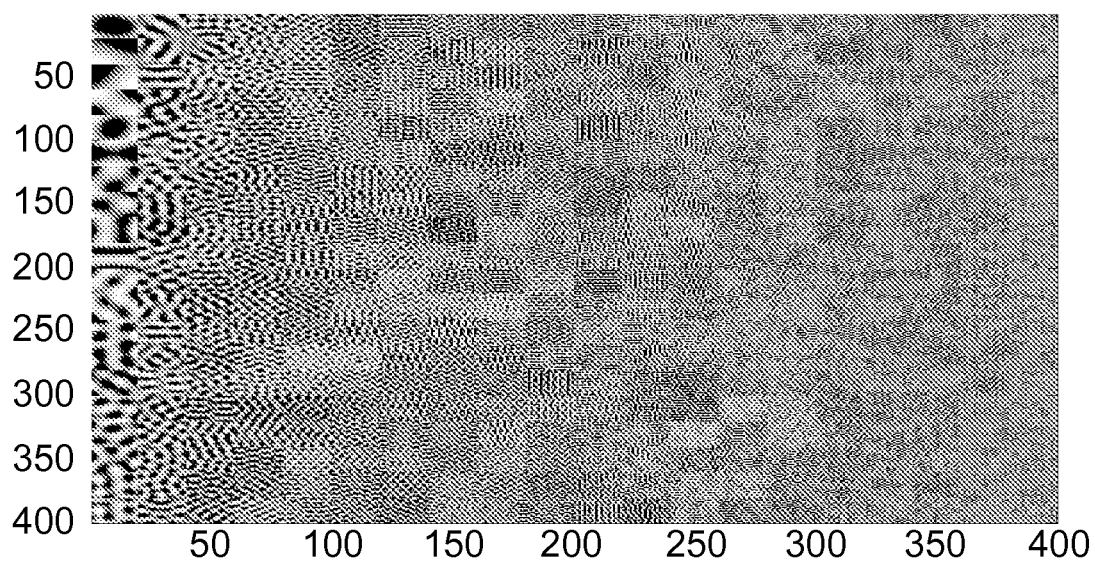
FIG. 7B illustrates a PCA image patch dictionary or basis functions for the nonwoven sample of FIG. 7A.

FIG. 7A illustrates a 20×20 PCA image patch dictionary or basis functions for a nonwoven sample and FIG. 7B shows an associated raw image of the nonwoven sample.

Figure 8A:
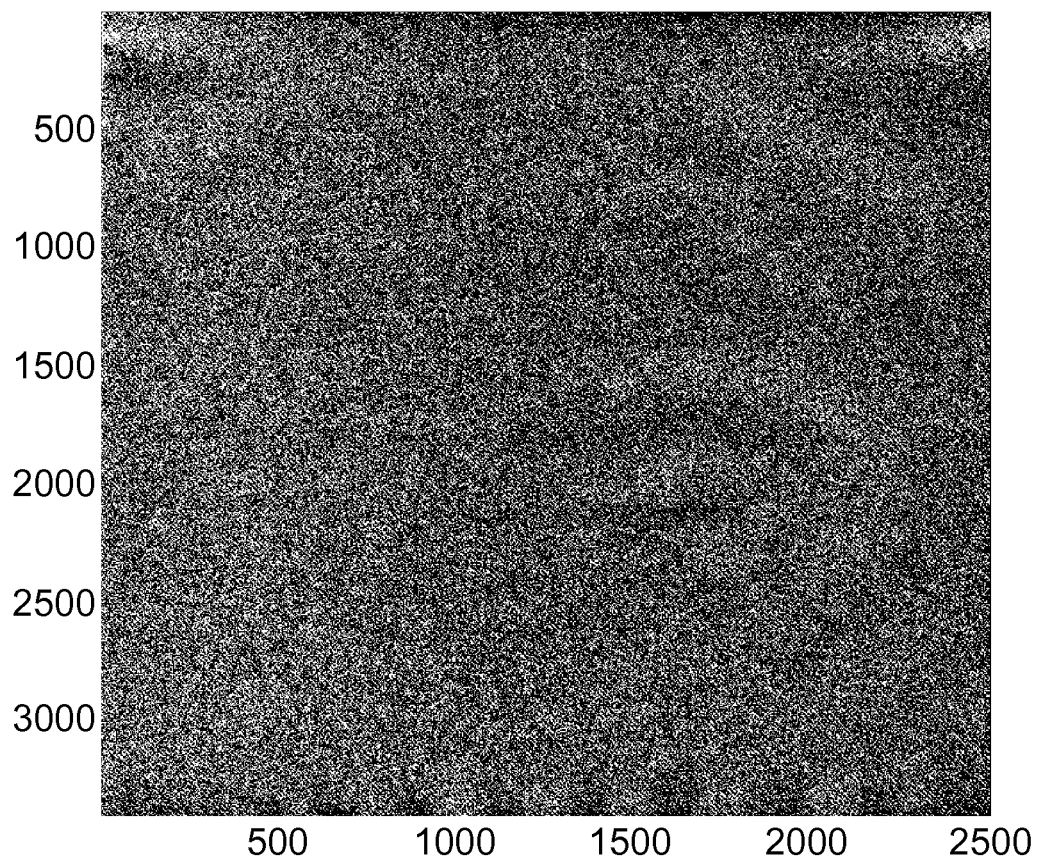
FIG. 8A illustrates an optical image of a flame-embossed film sample.
Figure 8B:
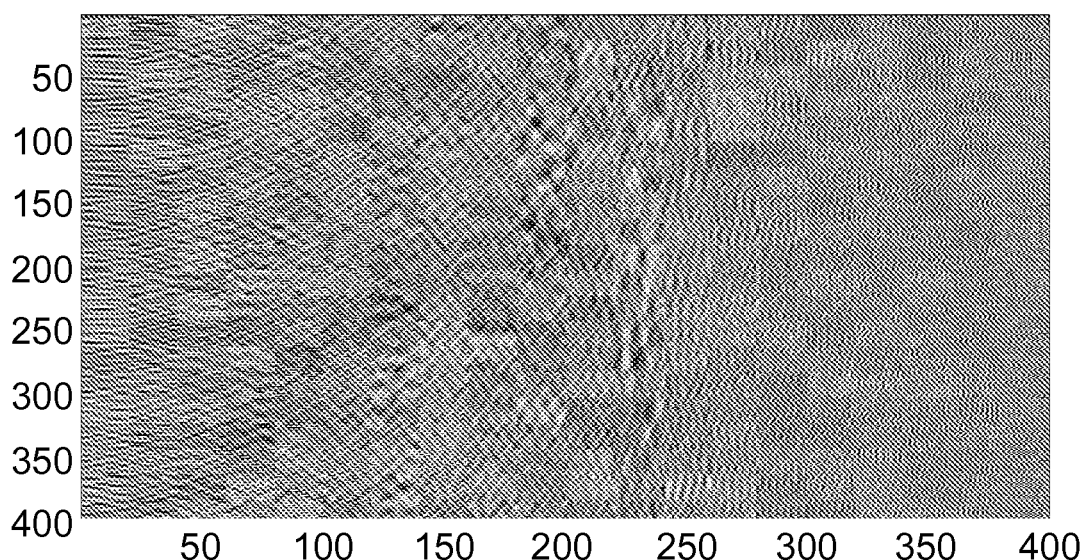
FIG. 8B illustrates a PCA image patch dictionary or basis functions for the flame-embossed film sample of FIG. 8A.

FIG. 8A illustrates a 20×20 PCA image patch dictionary or basis functions for a flame embossed mirror film and FIG. 8B shows an associated raw image of the flame embossed mirror film.

The systems and methods described above for authenticating material samples can be utilized to authenticate goods or products that incorporate the material samples. In some embodiments, a patch of material can be incorporated into a visible surface of a test object at a predetermined position. The test object can be, for example, any consuming disposables including, for example, coffee pod brewing systems, generic coffee pods, powered respirators, disposable filters, etc. The patch of material can originate from a batch of materials of substantially the same composition and produced in the same process. That is, the patch of material contains substantially the same composition and was produced by substantially the same process as the batch of materials. The characteristic features for the batch of materials have respective variability that varies from each other.

In an exemplary process for authenticating the test object, one or more digital images for each of the batch of materials can be captured. The variability of the materials can be extracted from the obtained digital images. A plurality of basis functions can be generated based on the extracted variability by using, for example, a principal component analysis (PCA). When the test object is under authentication, a digital image for the patch of material incorporated into a test object at the predetermined position can be captured. The digital image for the patch of material can be reconstructed by using a subset of the plurality of basis functions. In some embodiments, a reconstruction error for the reconstruction can be evaluated, and the test object is identified as authentic when the reconstruction error is lower than a predetermined value.

In some embodiments, the batch of materials can include, for example, a batch of multilayer optical films, or a batch of nonwovens, commercially available from 3M Company, Saint Paul, MN. The batch of multilayer optical films can be selected from, for example, a batch of flame embossed films, mirror films, or wavelength specific filter films.

Unless otherwise indicated, all numbers expressing quantities or ingredients, measurement of properties and so forth used in the specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

Exemplary embodiments of the present disclosure may take on various modifications and alterations without departing from the spirit and scope of the present disclosure. Accordingly, it is to be understood that the embodiments of the present disclosure are not to be limited to the following described exemplary embodiments, but is to be controlled by the limitations set forth in the claims and any equivalents thereof Exemplary embodiments of the present disclosure may take on various modifications and alterations without departing from the spirit and scope of the disclosure. Accordingly, it is to be understood that the embodiments of the present disclosure are not to be limited to the described exemplary embodiments, but are to be controlled by the limitations set forth in the claims and any equivalents thereof.

Reference throughout this specification to "one embodiment," "certain embodiments," "one or more embodiments," or "an embodiment," whether or not including the term "exemplary" preceding the term "embodiment," means that a particular feature, structure, material, or characteristic described in connection with the embodiment is included in at least one embodiment of the certain exemplary embodiments of the present disclosure. Thus, the appearances of the phrases such as "in one or more embodiments," "in certain embodiments," "in one embodiment," or "in an embodiment" in various places throughout this specification are not necessarily referring to the same embodiment of the certain exemplary embodiments of the present disclosure. Furthermore, the particular features, structures, materials, or characteristics may be combined in any suitable manner in one or more embodiments.

While the specification has described in detail certain exemplary embodiments, it will be appreciated that those skilled in the art, upon attaining an understanding of the foregoing, may readily conceive of alterations to, variations of, and equivalents to these embodiments. Accordingly, it should be understood that this disclosure is not to be unduly limited to the illustrative embodiments set forth hereinabove. In particular, as used herein, the recitation of numerical ranges by endpoints is intended to include all numbers subsumed within that range (e.g., 1 to 5 includes 1, 1.5, 2, 2.75, 3, 3.80, 4, and 5). In addition, all numbers used herein are assumed to be modified by the term "about." Furthermore, various exemplary embodiments have been described. These and other embodiments are within the scope of the following claims.

What is claimed is:

1. A method of authenticating material samples, comprising:

measuring, via a measurement component, one or more characteristic features for a plurality of material samples, the plurality of material samples being a batch of material samples that comprise substantially the same composition and are produced by substantially the same process, the one or more characteristic features for the batch of material samples having respective variability; and analyzing, via a computation component, the respective variability to extract one or more statistical parameters for each of the material samples, wherein measuring the one or more material properties includes obtaining one or more digital images for each of the batch of material samples, and extracting the respective variability from the obtained digital images, and the method further comprising determining a reference range based on the extracted statistical parameters for the batch of material samples, measuring the one or more characteristic features of a test material sample to be authenticated to obtain one or more statistical parameters thereof, and comparing the obtained one or more statistical parameters to the determined reference range to determine whether the test material sample is authenticated.

2. The method of claim 1, wherein if the obtained one or more statistical parameters is within the reference range, the sample is authenticated.

3. The method of claim 1, further comprising generating a plurality of basis functions based on the extracted variability.

4. The method of claim 3, further comprising obtaining one or more digital images for a test material sample to be authenticated, and reconstructing the digital images of the test material using a subset of the plurality of basis functions.

5. The method of claim 3, wherein the plurality of basis functions are generated using a principal component analysis (PCA).

6. The method of claim 1, wherein the one or more characteristic features includes an optical feature, an acoustical feature, an elastic feature, a structural feature, an electronic feature, a magnetic feature, an electrets related feature, or a mechanical feature.

7. The method of claim 1, wherein the batch of material samples is selected from a batch of abrasives, optical films, and nonwovens.

8. A system for authenticating material samples, comprising:

a measurement component configured to measure one or more characteristic features for a plurality of material samples, the plurality of material samples being a batch of material samples that comprise substantially the same composition and are produced by substantially the same process, the one or more characteristic features for the batch of material samples having respective variability; and a computation component configured to analyze the respective variability to extract one or more statistical parameters for each of the material samples, wherein the measurement component is configured to obtain one or more digital images for each of the batch of material samples, and the computation component is configured to extract the respective variability from the obtained digital images, and the measurement component is further configured to measure the one or more characteristic features of a test material sample to be authenticated to obtain one or more statistical parameters thereof, and the computation component is configured to determine a reference range based on the extracted statistical parameters for the batch of material samples and compare the obtained one or more statistical parameters to the determined reference range to determine whether the test material sample is authenticated.

9. The system of claim 8, wherein the measurement component includes a camera.

10. The system of claim 8, wherein the one or more characteristic features includes an optical feature, an acoustical feature, an elastic feature, a structural feature, an electronic feature, a magnetic feature, an electrets related feature, or a mechanical feature.

11. The system of claim 8, wherein the batch of material samples is selected from a batch of abrasives, optical films, and nonwovens.

* * * * *

UNITED STATES PATENT AND TRADEMARK OFFICE
CERTIFICATE OF CORRECTION

PATENT NO. : 10,551,524 B2
APPLICATION NO. : 15/533290
DATED : February 4, 2020
INVENTOR(S) : Anthony Sabelli et al.

It is certified that error appears in the above-identified patent and that said Letters Patent is hereby corrected as shown below:

In the Claims

Column 12
Line 24, Delete "thereof" and insert -- thereof. --, therefor.

Signed and Sealed this
Sixth Day of April, 2021

Drew Hirshfeld
*Performing the Functions and Duties of the*
*Under Secretary of Commerce for Intellectual Property and*
*Director of the United States Patent and Trademark Office*